Figure 6:
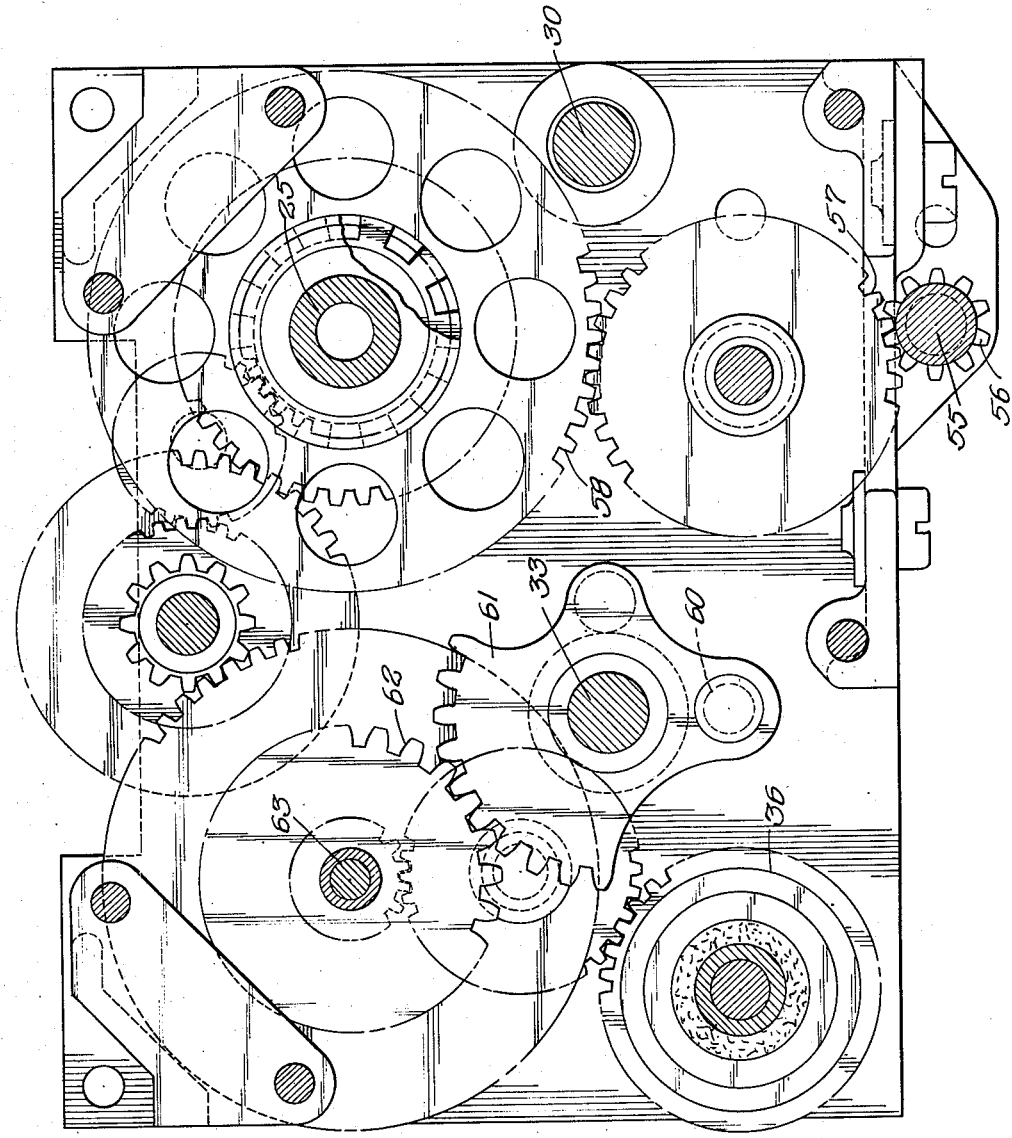

April 25, 1950            R. W. MAY            2,504,998
SHAFT POSITIONING APPARATUS
Filed April 12, 1946                              6 Sheets-Sheet 1
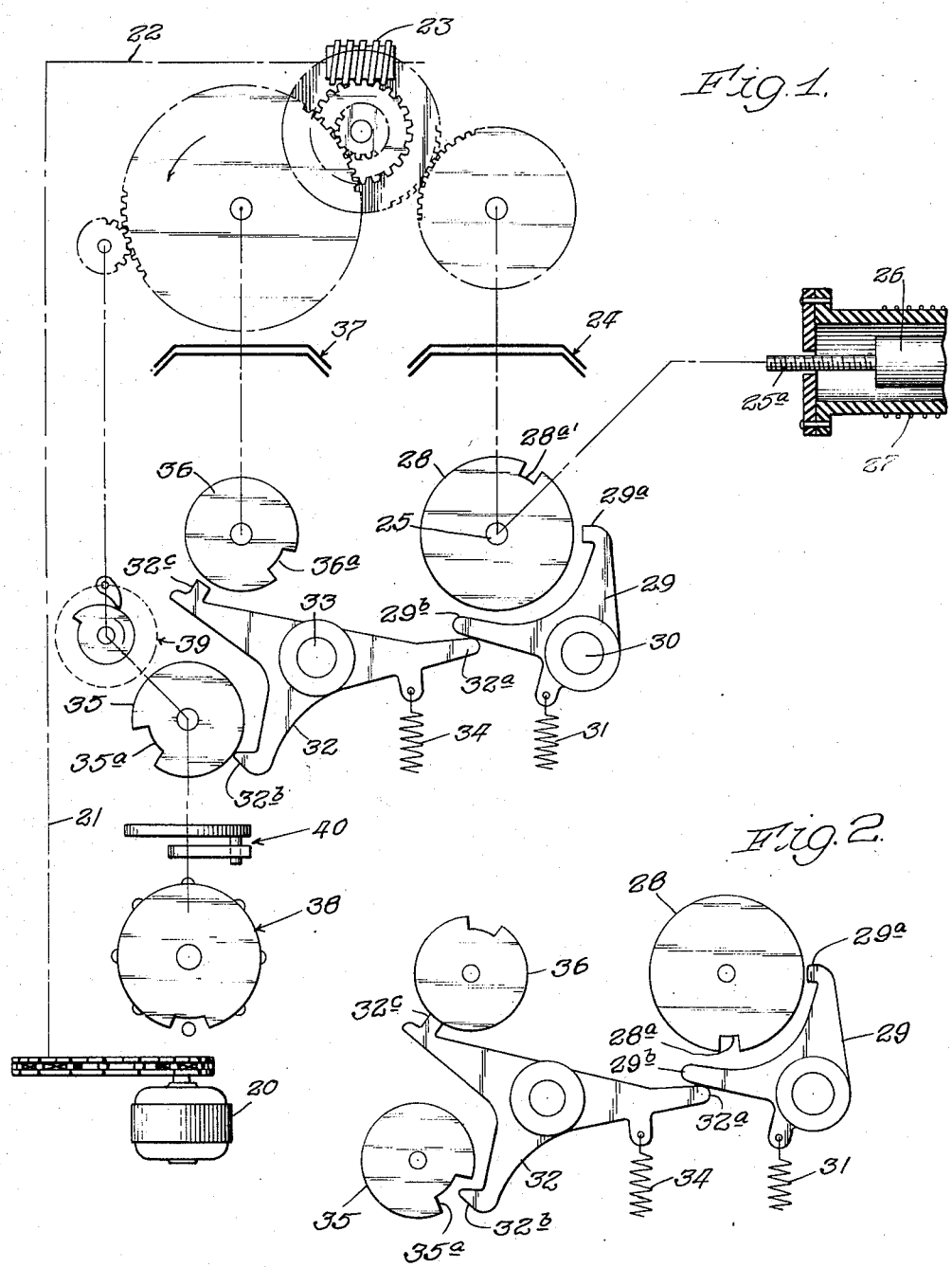
Inventor:
Richard W. May,
By Chitton, Schraeder, Merriam & Kofgren,
Attys.

April 25, 1950 R. W. MAY 2,504,998
SHAFT POSITIONING APPARATUS
Filed April 12, 1946 6 Sheets-Sheet 2
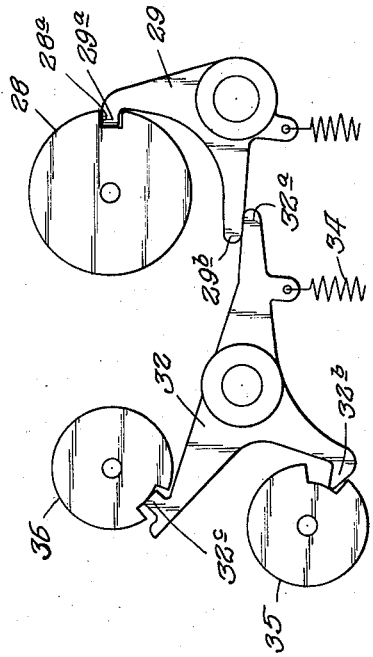
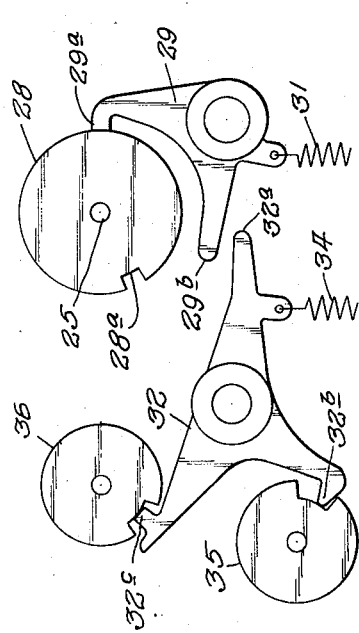
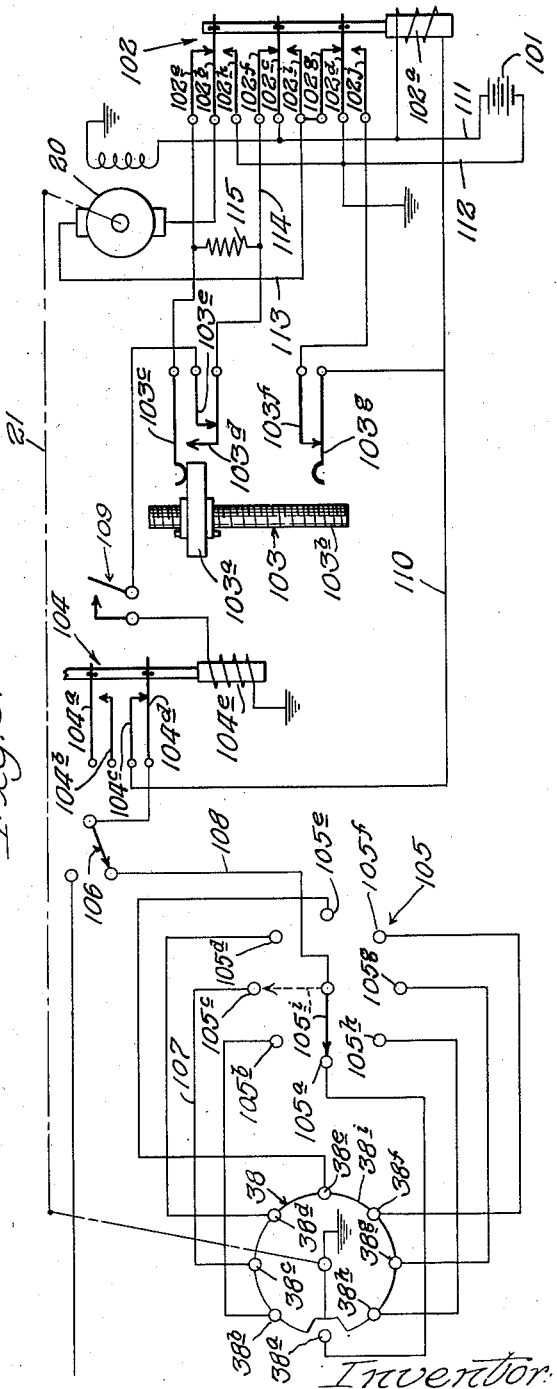
Inventor:
Richard W. May.

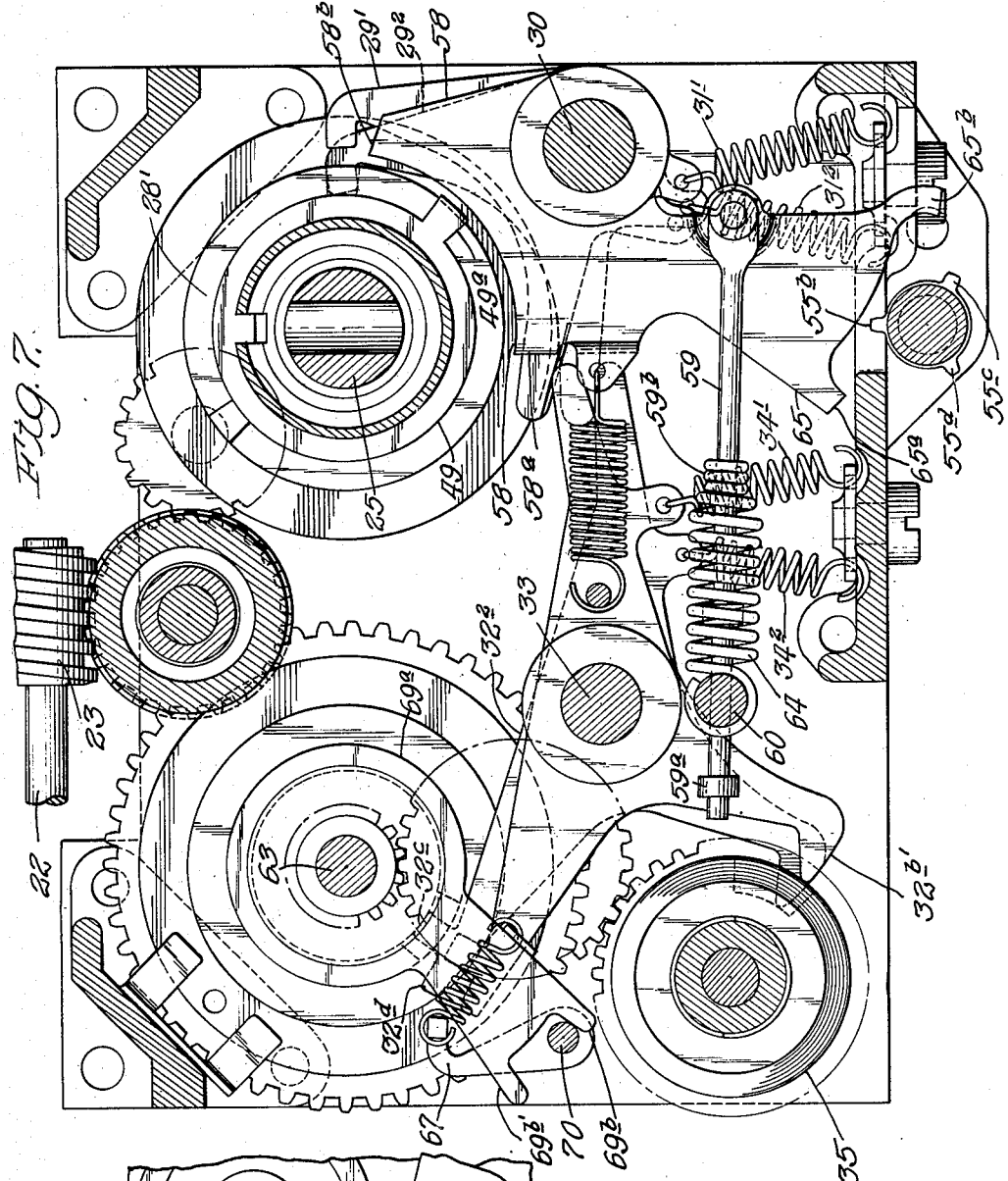
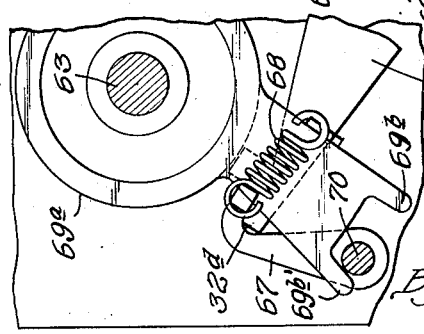

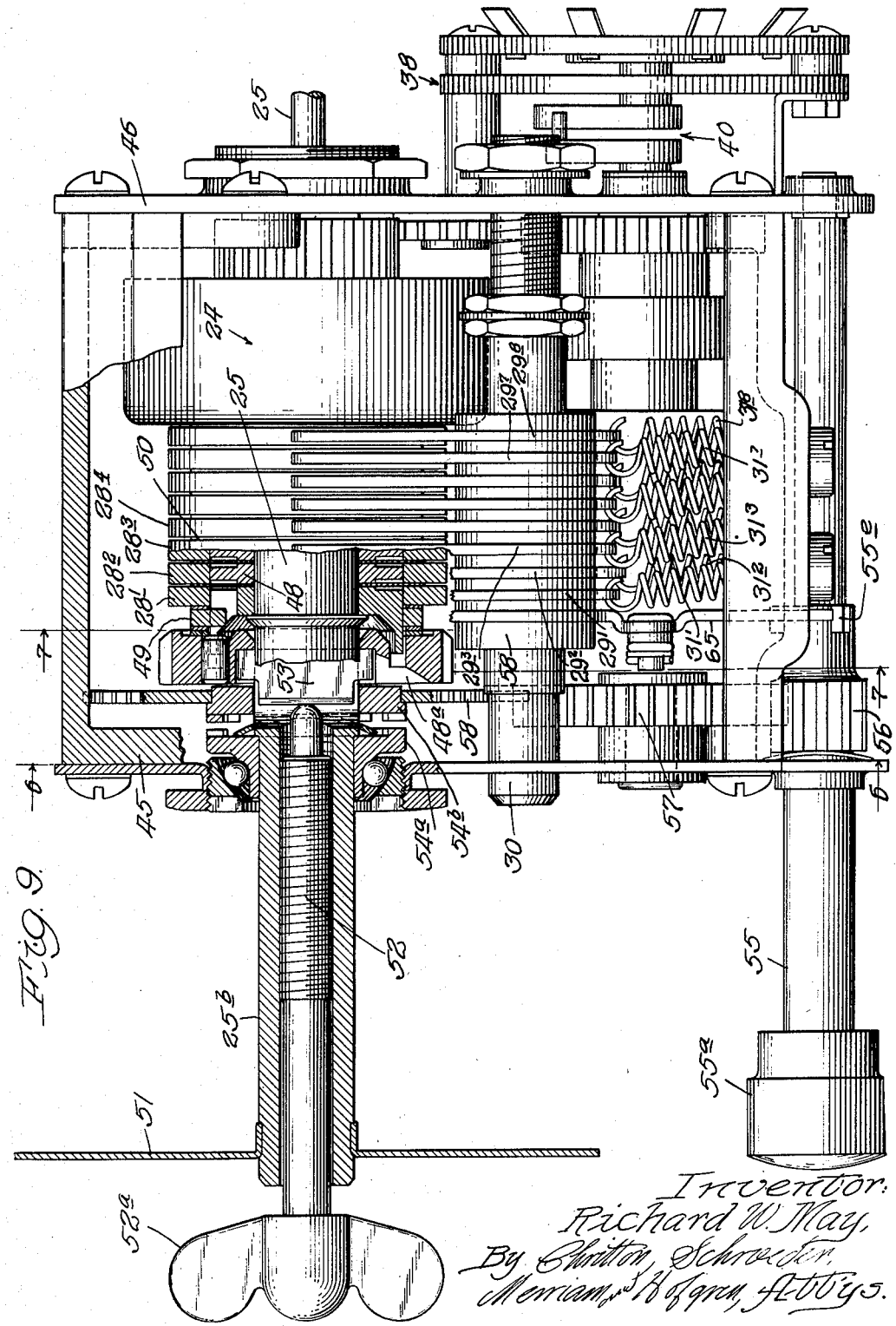

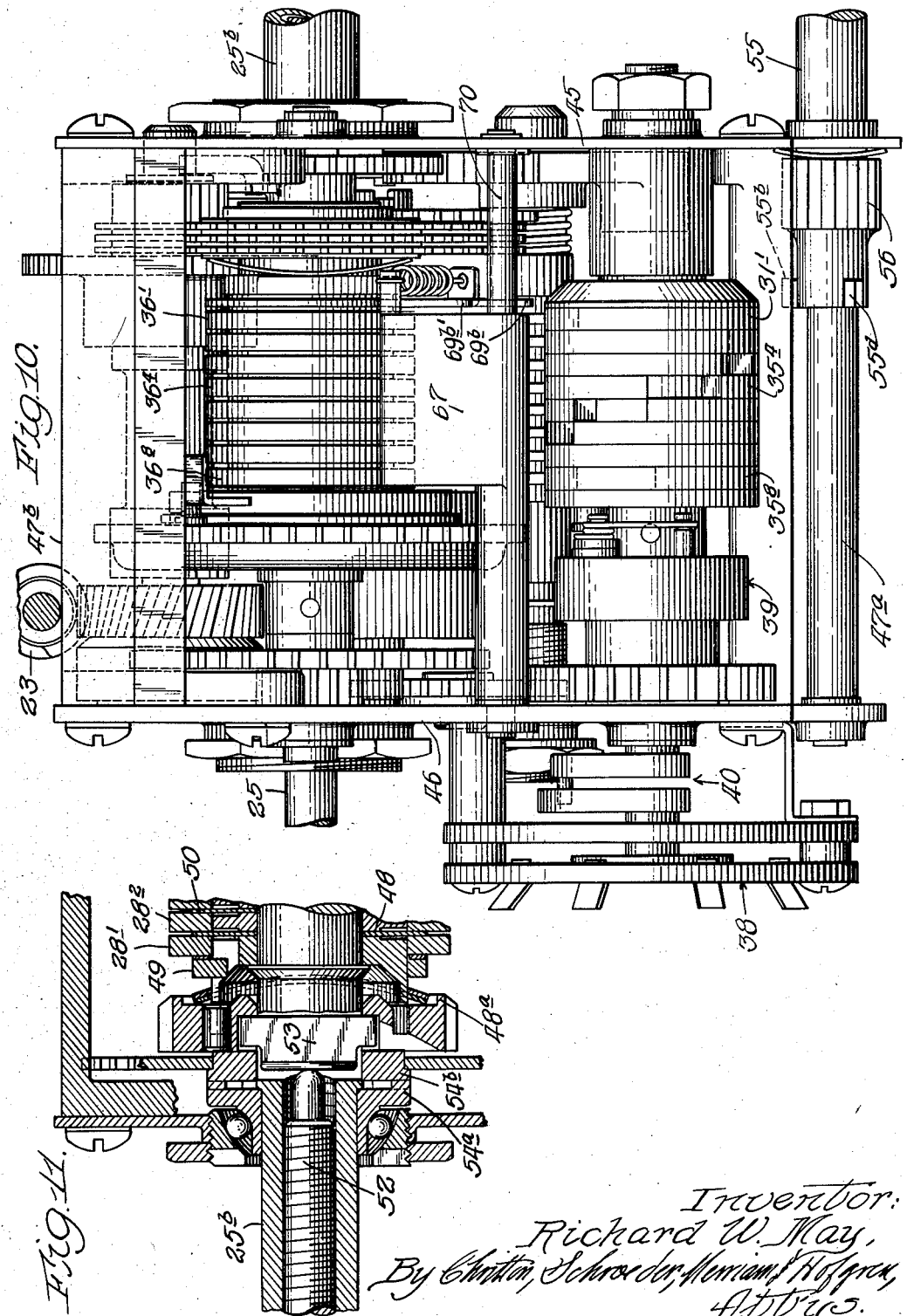

Patented Apr. 25, 1950

2,504,998

UNITED STATES PATENT OFFICE 2,504,998

SHAFT POSITIONING APPARATUS

Richard W. May, Cedar Rapids, Iowa, assignor to Collins Radio Company, a corporation of Iowa Application April 12, 1946, Serial No. 661,586

21 Claims. (Cl. 74—10.2)

This invention relates to shaft positioning apparatus, and more particularly to automatic apparatus for positioning a tuning shaft in radio equipment, as the shaft of a permeability tuned oscillator, at any desired point in any of a plurality of revolutions.

The automatic tuning apparatus with which this application is concerned is of the type mechanically positioning the rotatable shaft of a tuned element as the result of a sequence of automatic operations eventuating in the shoulder of a stop member on the tuning shaft abutting against a selected stop element, as a pawl, to effect extremely accurate positioning of the shaft. Apparatus of this general type has been the subject of a number of patents issued to Arthur A. Collins and others, and representative of one of the more recent of these patents is Collins Patent No. 2,285,414, issued June 9, 1942.

While the earlier mechanical automatic tuning devices of this general type were adapted for operation only within the limit of a single turn of the shaft to be tuned, of recent years devices of this type have been developed capable of positioning a shaft with all the accuracy of a single turn unit but at any desired point in any of a plurality of turns, these generally being termed "multi-turn" units. Multi-turn automatic shaft positioning devices of the mechanical type form the subject matter of certain copending applications, as Arthur A. Collins application, Serial No. 472,717, filed January 18, 1943 and my Patent No. 2,391,470 which issued December 25, 1945.

One difficulty with prior multi-turn automatic tuning devices of the kind shown in the above mentioned patents and applications is that a single pawl cooperated with three different slotted rotatable elements, comprising the stop ring and primary and secondary cam drums. The normal sequence of operations in such a device involves the primary cam stopping with a slot under the pawl being selected for stopping, thereafter another portion of the pawl dropping partially into the slot in the secondary cam to determine the turn or rotation of the main shaft in which the stopping operation will take place, and finally the stopping end of the pawl dropping into a slot in the stop ring on the main shaft. This involved three partial movements of the pawl, two preliminary movements and a final stopping movement in which all portions reached their final position in the corresponding slots, and this required a very high degree of accuracy in the manufacture of the parts to insure proper operation. I have devised a multi-turn mechanical automatic shaft positioning unit which obviates the necessity for such a high degree of accuracy, and which insures better engagement of the parts in the slots, by dividing the single pawl heretofore used into a stopping pawl and holding means, the stopping pawl cooperating only with the stop ring and the holding means comprising the second pawl segment cooperating with the primary and secondary cam drums and with the stopping pawl. This enables the portions of the holding pawl to drop further into the corresponding slots in the primary and secondary cam drums during the earlier portions of the sequence of operations, and imposes no frictional resistance to the final dropping in of the stopping pawl into the slot in the stop ring.

Another feature of this invention is that it provides means for holding the pawls out of contact with the various cooperating rotating elements during movement of the various rotatable parts to "home" or initial position as a preliminary to the stopping operation; yet another feature of this invention is that it provides improved manual means for setting the stop rings in desired predetermined positions for automatic operation, this improved manual set up mechanism including a clutch rendering the manual rotatable arrangement ineffective when the stop rings are tightened for automatic operation, and improved limit stop arrangement; and still other features and advantages will be apparent from the following specification and the drawings, in which:

Figure 1 is a schematic diagram of apparatus embodying my invention with the parts in an initial position in the automatic tuning cycle; Figure 2 is a partially schematic diagram comprising a portion of the part shown in Figure 1, but in the position assumed after the primary or selector cam drum has stopped in the selected position; Figure 3 is a partial schematic diagram similar to Figure 2, but with the parts in still another position, the position assumed after the secondary or turn determining cam drum has reached a position rendering the stop combination operative within the next rotation of the tuning shaft; Figure 4 is a partial schematic diagram similar to Figures 2 and 3, but with the parts in their final position after stopping has been effected; Figure 5 is a wiring diagram of a circuit adapted to operate the particular embodiment of my invention shown; Figure 6 is a sectional view of a unit embodying my invention, more particularly showing the gearing adjacent one mounting plate, along the line 6—6 of Figure 9; Figure 7 is another sectional view parallel to that of Figure 6 but displaced therefrom, along the line 7—7 of Figure 9; Figure 8 is a fragmentary detailed view of certain parts shown in Figure 7, but in an alternate position; Figure 9 is a side elevational view, looking from the right of Figures 7 and 8, partly broken away; Figure 10 is a side elevational view of the unit from the opposite side to that of Figure 9; and Figure 11 is a partial detailed sectional view corresponding to a portion of Figure 9, but with the parts in an alternate position.

Automatic shaft positioning units of the multi-turn type are particularly adapted for use with certain elements of a radio set which can be better tuned by a threaded shaft rotated through a plurality of revolutions. For example, a permeability tuning core is preferably moved in or out of its cooperating coil by rotation of such a threaded shaft or lead screw which may rotate through twenty turns to vary the inductance from minimum to maximum; and certain other types of radio components, as certain kinds of condensers, carbon pile resistors, and the like are also preferably operated by lead screws. Multi-turn units of the character with which this application is concerned are the subject matter not only of the above mentioned Collins copending application and of my above mentioned patent, but also of Collins Patent No. 2,409,192, and of my copending application Serial No. 515,250 filed December 22, 1943.

A radio receiver or transmitter embodying an automatic tuning arrangement of the kind disclosed here would be provided with one or more line shafts driven by a reversible motor, such shaft or shafts in turn driving through appropriate gearing one or more single-turn units of the kind disclosed in the previous mentioned Collins patents, or one or more multi-turn units of the kind disclosed in the Collins application, or both, these units positioning the shafts of a combination of tuning elements in positions appropriate to a given number of preselected frequencies. The operator of the radio set would then merely turn a switch or operate a telephone dial type of switch to select similar stop combinations in all of the units, whereupon the various circuit elements would be instantly and automatically tuned to the desired predetermined frequency. For simplicity of explanation only a multi-turn unit is shown here, but it will be understood that this can be used in combination with single turn units of the kind previous shown in issued patents or of the kind shown in the aforesaid Collins application Serial No. 472,717.

In the particular embodiment of my invention illustrated here, and referring now first more particularly to Figure 1, a reversible electric motor 20 drives a main shaft 21 in the radio equipment which in turn drives a cross shaft or line shaft 22, it being understood that there may be a plurality of automatic tuning units driven from the same or different line shafts, one only being illustrated here as representative.

The line shaft 22 is here shown as having thereon a worm 23 which operates through suitable gearing to rotate the driving element of a slip clutch 24, the driving element of this clutch being connected to and rotating the main shaft of the shaft positioning unit, here identified as 25. This shaft is suitably coupled, in the particular embodiment illustrated, to a threaded shaft 25a serving as the lead screw on which is mounted the slug or core 26 adapted to be moved to effect permeability tuning of the coil 27, which would be the inductance element of the tank circuit of the oscillator of an aircraft transmitter, as one example. This core is so mounted (as by a conventional splined arrangement not shown) as to enable axial movement while preventing rotational movement thereof, so that the threaded relation between the core 26 and shaft 25a effects axial movement of the core, and thus variation of inductance, upon rotation of the main shaft. The number of turns necessary to move the core through its full desired range of movement may be anything desired, as for example twenty turns.

Mounted on a drum on the shaft 25 in a manner hereafter to be more fully described, and normally nonrotatable with respect to the shaft, are a plurality of tuning stop rings 28. This stop ring or stop member cooperates with the end 29a of the stop element or pawl 29 pivotally mounted on the shaft 30, this pawl being biased or urged by the spring 31 in a direction tending to cause the end 29a to drop into the slot and be brought into stopping engagement with the shoulder 28a' comprising one side of the slot 28a in the stop ring. As will be readily apparent, whenever the pawl 29 is free to permit the end 29a to drop into the slot 28a rotation of the main shaft 25 will cause this shaft to be stopped at a predetermined position, upon engagement of the stop ring shoulder and the pawl end, with a very high degree of precision.

All stop pawls which are not to be operated, and during the beginning or initial stages of an automatic tuning cycle, even the stop pawl which is to be operated, are held against stopping engagement with their cooperating stop rings by engagement of the end 29b of the pawl 29 with the end 32a of a secondary pawl 32 pivotally mounted on the shaft 33 and normally urged or biased in a direction tending to pull the end 32a downward (speaking with respect to the position of the parts as illustrated in Figure 1) by the spring 34.

This secondary pawl 32 cooperates with two cam arrangements, normally termed the primary or selector cam and the secondary or turn determining cam, the respective cam rings here illustrated being identified as 35 and 36. The end portion 32b of the secondary pawl 32 is adapted to be received in the slot 35a of the primary or selector cam when the particular stop combination is selected; and the end or portion 32c of the secondary pawl is adapted to be received in the slot 36a of the secondary cam when the shaft 25 has reached the turn in which stopping is to be effected.

The secondary cam arrangement 36 must also include slip or frictional drive means in its drive arrangement, this being here illustrated schematically as the slip clutch 37, although in practice the secondary cam rings may be frictionally mounted on their mounting drum to provide the mechanical equivalent of such a separate slip clutch. The turn determining or secondary cam arrangement must be rotated in synchronism with rotation of the main shaft 25, but at a reduced rate with respect thereto, as by suitable gearing which may make the main shaft 25 rotate eighteen and one-half or nineteen times (just slightly under the maximum number of turns permitted for the main shaft) while the secondary cam arrangement is rotating once. The drive arrangement is also drivingly connected to the primary cam 35 and to the selector switch 38, this connection being through a one tooth ratchet here identified in general as 39, between the selector cam and its drive gearing, and the lost motion connection 40 between the selector cam and the selector switch 38.

The general arrangement and principles of operation of a multi-turn unit of the character heretofore described, except for the fact that one single pawl cooperated with the stop ring and the primary and secondary cams of a given stop combination, has been the subject matter of my prior Patent No. 2,391,470 and the aforementioned Collins application No. 472,717, and other patents and copending application, so that the general description of operation and structure will hereafter be kept as brief as is consistent with a sufficient disclosure to enable a full discussion of the particular improvements which comprise the subject matter of this application. It is felt that the structure, and the improvements which I am here first disclosing and claiming can best be understood by first describing an automatic tuning cycle of operation, with reference to the schematic diagrams comprising Figures 1 to 4 and the circuit diagram comprising Figure 5.

When an automatic tuning cycle is initiated by movement of the manual switch or the like, the motor 20 starts rotating in a direction tending to rotate the main tuning shaft and stop rings 28 counterclockwise (as they are viewed in Figure 1) the drive arrangement being such that the secondary cams 36 are simultaneously rotated counterclockwise, while the primary cams 35 are rotated clockwise. The first few degrees of rotation of the primary cam 35 causes the end 32b of the pawl 32 to ride up out of the slot, this lifting the portions 32c and 29a out of their cooperating slots. Thereupon the pawls are held in an inoperative position by an anvil or holding arrangement hereinafter to be described, rotation of the parts continuing until the main tuning shaft 25 has been brought to one of its terminal positions, generally termed the "home" position. Thereafter rotation of the drive means continues (the main shaft 25 standing still and the clutch 24 slipping) until the selector cam 35 and selector switch 38 have rotated to a position opening an electrical circuit, this effecting selection of the stop combination to be operative by positioning a selector cam slot beneath the end 32b of the pawl of the combination desired to be operated. Thereupon, through operation of a relay to be more fully described hereafter, the drive motor 20 reverses and effects rotation of the shaft 25 and the secondary cam drum 36 in the opposite direction. During this tuning portion of the cycle of operation the selector cam and selector switch stand still, the connection 39 ratcheting idly and any slight backing up of the cam 35 not affecting the position of the selector switch 38 because of the lost motion coupling 40. The mechanical parts are shown in Figure 1 in a position which they might assume when the shaft 25 had reached home position and the cams were being rotated to effect selection, Figure 2 illustrating the position of the mechanical parts when selection has been effected.

With the parts in the position shown in Figure 2 the portion 32c of the pawl bears against the periphery of the secondary cam 36, the spring 34 being prevented from moving the pawl further by this engagement. In this position of the parts the pawl 29 has its end 29a held out of engagement with the corresponding stop ring 28, so that even though the slot 28a rotates under this end of the stopping pawl, stopping does not take place. However, when the predetermined turn has been reached the slot 36a in the secondary cam 36 comes into registry with the end 32c of the secondary pawl, and the action of the spring 34 causes this pawl to move to the position shown in Figure 3, completely freeing the pawl 29. The stopping end 29a of this pawl thereupon is brought into engagement with the periphery of the stop ring 28 through the action of the spring 31, and sometime during the next rotation of the main shaft 25 the end 29a of the pawl drops into the slot 28a in the stop ring, as shown in Figure 4, and the shaft is brought to a stop at the predetermined position. The use of two pawls rather than a single pawl is of considerable advantage in that the pawl 32 is able to drop into its cooperating slots, as shown in Figure 3, even though the pawl 29 is still held out; and this pawl is then free to move into its slot without any frictional resistance which might be imposed by engagement of the parts 32b and 32c with the walls or sides of their cooperating slots.

Referring now more particularly to Figure 5, a circuit adapted to effect the cycle of operation just described is illustrated, and the elements of this circuit and their operation will be described. A battery 101 is representative of any appropriate source of power for the motor 20 and the relays effecting the desired circuit changes, these including the motor control relay 102. This relay has an actuating coil 102a, three movable switch members 102b—d, three fixed contacts adapted to be engaged in the proper position of the movable contacts, these fixed contacts being identified as 102e—g, and three other or opposite fixed contacts adapted to be engaged by the movable contacts in the lower limit of their range of movement, these being here identified as 102h—j. This motor control relay and the limit switch identified in general as 103 cooperate to achieve the desired sequence of operations, the relay 104 being primarily for interlocking purposes. While various forms of limit switches may be used, the particular one illustrated here is the subject matter of my Patent No. 2,391,470.

A manual selector switch, here identified in general as 105, is shown as having eight switch taps 105a—h wired to the corresponding switch points 38a—h of the automatic selector switch 38. The manually movable switch arm 105i is adapted to engage any one of the eight associated switch taps and thus to complete a circuit to any one of the corresponding automatic selector switch contact points when the switch 106 is in the position illustrated, this switch being adapted to enable selection from some remote point when thrown to its other position. The relay 104 has cooperating contacts 104c and 104d which control the tuning circuit, and interlocking contacts, as 104a and 104b, which may control carrier emission to prevent transmission during automatic tuning, for example.

Assuming that the parts of the device are in one automatically selected position (corresponding to the selector switch position 38a, for example) and that it is desired to select another predetermined setting, movement of the switch arm 105i might be made to the dotted line position, for example. This movement completes a circuit from ground through the selector switch rotatable disk 38i, contact 28c, wire 107, contact 105c, switch arm 105i, wire 108, switch 106, contacts 104c and 104d (it being assumed that the manual carrier control switch 109 is open and relay coil 104e not energized), wire 110, motor relay coil 102a, wire 111, battery 101, and wire 112 to ground. This energization of the relay coil 102a causes the movable switch elements 102b—d to move from the position shown in the drawing to their lower positions. This energizes the motor 20 by a circuit including wire 111, contacts 102c and 102i, wire 113, the motor armature, contacts 102b and 102h, and the wire 112 back to the battery. The motor is so arranged that energization in this direction effects rotation of the parts in a direction toward the "home" position, the ratchet 39 picking up the selector cam 35 and the selector switch 38 and causing rotation of these parts. At the same time the actuating member 103a of the limit switch begins to travel downwardly (speaking with respect to the position of the parts as illustrated in Figure 5) through rotation of the threaded shaft 103b. Shortly after this movement is initiated movable contact element 103c makes engagement with contact 103d and breaks its engagement with contact 103e, thus disabling the circuit of the carrier control switch 109 and preventing any possibility of carrier transmission during the remainder of the automatic tuning cycle. The disk 38i of the selector switch 38 is also rotated, but intermittent breaking of the ground circuit when the slot in this disk passes over contact 38c has no effect on the operation of the motor 20, a holding circuit for the motor control relay having been established through the limit switch contacts 103f and 103g and relay contacts 102d and 102j.

The motor continues operation until the tuned shaft has reached home position, the limit switch actuating member 103a shortly thereafter breaking contact between the elements 103f and 103g, continued rotation of the motor 20 thereafter depending upon the circuit through the automatic selector switch 38. As soon as the slot in the selector switch disk 38i comes opposite the contact point 38c, therefore, the circuit of motor relay 102 is broken and the movable contacts of this relay move to the position shown in the drawing, the motor stopping and leaving the selector cam and selector switch at the position determined by the selector switch contact point chosen, thus effecting selection of the desired stop combination. Change of the contacts comprising part of the motor control relay 102 immediately completes another circuit in such a way as to cause operation of the motor in the reverse direction, this circuit including wire 111, contacts 102c and 102f, wire 114, contacts 103c and 103d, contacts 102b and 102e, the motor armature, contacts 102d and 102g, and wire 112 back to the battery. This reverse operation of the drive motor and automatic tuning unit parts continues until the tuning shaft is stopped in its predetermined desired position by engagement of the selected stopping pawl 29 with the stopping shoulder of the slot in the cooperating stop ring, the clutch thereafter slipping to permit the drive motor to continue operation for a sufficient length of time to assure that a complete rotation of the shaft 25 through its entire range of movement (as twenty turns) would have been completed if the shaft had not been stopped. Termination of motor operation when this full range of movement has been gone through is effected by opening of the limit switch contacts 103c and 103d by the actuating member 103a. A bridging resistor 115 may thereafter provide just sufficient current to keep the stopping pawl in firm engagement with the stopping shoulder, as claimed in another copending application, the torque being insufficient to overcome the friction of the slip clutch 24.

Referring now more particularly to the structural details of the automatic positioning unit, reference will be had more particularly to Figures 6 to 11, inclusive. The parts are mounted on and between the plates 45 and 46 held in appropriate spaced relation by posts, as the posts 47a, 47b, etc. The tuned shaft 25 has fixedly mounted thereon a drum 48, this drum having a longitudinally but non-rotatably movable (with respect to the shaft) forward portion 48a. The drum carries the desired number (here shown as eight) of tuning stop rings 28₁ to 28₈ and the terminal stop ring 49, these being supported by spacer rings 50 which are keyed to the drum so as to be axially but non-rotatably movable thereon. The forward portion 25b of the tuning shaft carries the tuning dial 51 and is internally threaded to receive a locking stud 52 with a wing nut head portion 52a. The inner end of the stud is received by a recess in a pressure member 53 which is longitudinally but non-rotatably movable with respect to the shaft 25, being mounted in a slot therein. Inward movement of the locking stud 52 transmits pressure through the member 53 to lock the stop rings 28 fixedly in position; while rotation of the head 52a in a direction effecting outward movement of the stud 52 releases this pressure and enables the stop rings to be moved around on the drum to change the stopping setups.

When it is desired to initially set up the predetermined stopping positions, or to subsequently change any of them, the unit would be operated automatically in the setting to be set up or changed, then the stud 52 would be backed off, and the shaft 25 would be manually rotated to the new setting desired (the selected stop ring remaining stationary during this manual rotation because of its engagement with its associated stop). Backing off of the stud 52, in the embodiment of the automatic positioning unit here illustrated, serves to engage the manual operating arrangement, while tightening of the stud 52 to the position locking the stop rings 28 for automatic operation disengages the manual arrangement, this being a considerable improvement in that it prevents manual interference during subsequent automatic operation. The engagement and disengagement is effected by a clutch 54 comprising a stationary part 54a (stationary with respect to the shaft 25) and a part 54b which is axially but non-rotatably movable on the main tuning shaft, this latter part being normally spring urged toward the cooperating clutch part, the parts being of the conventional toothed clutch type. When the stop rings are locked on the stop ring drum, as illustrated in Figure 9, the clutch parts are disengaged; but loosening of the stud 52, and thus of the stop rings, effects engagement of the clutch parts as illustrated in Figure 11. When the clutch is engaged rotation of the manual operating knob 55a on the manual operating shaft 55 operates through the gears 56, 57 and 58 (best seen in Figures 9 and 6) to effect rotation of the clutch part 54b and thus of the shaft 25. On the other hand, when the clutch 54 is disengaged, rotation of the manual operating shaft 54 merely results in idle rotation of these manual operating gears.

In addition to providing the clutch to prevent interference with automatic operation by the manual means when the unit is conditioned for automatic operation, I also provide means for stopping the shaft 25, at each end of its desired range of movement, at an earlier point when it is being manually rotated than when it is being automatically rotated. One of the difficulties occasionally encountered with prior positioning units of this general type was that someone setting up a frequency channel near the very edge of the tuning range covered would sometimes force the tuning shaft manually to a position it could not attain automatically, since a great deal more torque could be exerted on the shaft by the manual means than could be exerted through the slip clutch by the drive means operative during automatic positioning. Referring now more particularly to Figure 7, it will be seen that the terminal stop ring 49 is provided with an extending or stop shoulder portion 49a adapted to cooperate with the ends of the terminal stop pawl 58. This terminal stop member 58 is mounted on the pawl shaft 30 and is actuated by the link 59 having a lost motion connection through the pin 60 with the sector 61 operated by a gear 62 on the shaft 63 of the turn determining cam, these latter parts being best seen in Figure 6. A spring 64, best seen in Figure 7, cooperates with collar arrangements 59a and 59b to effect actuation of the link 59 and thus of the terminal stop member 58, this member normally being spring biased to the intermediate position in Figure 7, where it is inoperative. When the main shaft 25 has gone through the desired predetermined number of revolutions the turn determining arrangement moves the sector 61, the link 59 and the terminal stop 58 to such a position that the stop lug 49a strikes an end of the terminal stop pawl on the next revolution of the shaft 25, this arrangement being operated at both ends of the desired range of movement of the tuned shaft, as twenty turns.

In order to provide for stopping of the tuned shaft, during manual operation, at a point somewhat ahead of that at which it would be stopped by the terminal stop means just described, I provide a downwardly extending terminal stop member 65, which may be integral with the terminal stop 58 and likewise pivotal about the axis provided by the pawl shaft 30. This latter terminal stop member has portions 65a and 65b adapted to cooperate with stop lugs or projections 55b—d. When the unit is conditioned for automatic operation and the clutch 54 disengaged, movement of the link 59 and of the terminal stop members 58 and 65 effects stopping by engagement of the end 58a or 58b with the stop shoulder 49a, depending upon the direction of movement of the shaft 25, engagement of the stop portions 65a or 65b with the lugs 55b—d being of no effect, the shaft 55 not being rotated. On the other hand, when the clutch 48 is engaged and the shaft 55 is being rotated, the provision of the three lugs 55b—d, and the relative proportioning of the parts, results in one of these lugs striking one of the terminal stop shoulders 65a or 65b before the terminal stop shoulder portion 49a strikes one of the cooperating ends 59a or 58b. This positively prevents any forcing of the main shaft 25, near the very ends of its range of movement, past a point to which the automatic positioning cycle can repeat the operation.

As has been explained heretofore in connection with the description associated with Figure 1, each stop combination comprises a stopping pawl 29, a stop ring 28, a holding pawl 32 and primary and secondary cams 35 and 36. These stop combinations are repeated, in the unit, in any desired number, there being eight such combinations in the particular unit illustrated. As may be best seen in Figure 7, 9 and 10, there are eight stop rings $28_1$ to $28_8$ mounted on the stop ring drum on the main shaft 25; eight associated stop pawls $29_1$ to $29_8$; eight cooperating holding pawls $32_1$ to $32_8$; eight selector cam rings $35_1$ to $35_8$; and eight secondary cam rings $36_1$ to $36_8$. The use of separate stopping and holding pawls is very important, as has been described earlier, in improving the effectiveness of operation of the unit and increasing the tolerances permissible in manufacture.

In the initial stages of an automatic tuning cycle, while the tuned shaft is being rotated to home position and the selector cam is thereafter being rotated to effect selection, previous units have heretofore permitted the pawls to play up and down against the surfaces of the associated stop or cam rings, undesirable both from a standpoint of wear and because sometimes a pawl caught in a slot, at least briefly. I have overcome this objection by providing means for holding all of the pawls inoperative during the rotation incident to bringing the parts back to home position and thereafter effecting selection.

This pawl holding arrangement, or pawl anvil as it is sometimes termed, is best seen in Figures 7, 8 and 10 to which reference will now be particularly made. The pawl anvil, here identified as 67, is a hook like member, as may be best seen in side elevation in Figures 7 and 8, of sufficient breadth to extend across the entire assembly of stop combinations, as may be best seen in Figure 10. The hook like end portion of this holding or anvil member 67 is adapted to engage end portions 32d of all of the holding pawls, as may be best seen in Figure 8, the member 67 being adapted to be urged toward and held in this position by the spring 68. An actuating or control arrangement is provided for determining the position of the anvil member 67, this comprising the member consisting of a ring portion 69a frictionally mounted on the secondary cam drum shaft 63, as may be best seen in Figure 7, and the extending portion 69b. When an automatic tuning cycle is initiated the secondary cam drum and ring 69a move counterclockwise (speaking with respect to the position of the parts as illustrated in Figure 7), the member 69 moving to the position shown in Figure 8 and standing there (because of engagement of the portion 69b′ with the shaft 70 on which the anvil member is pivotally mounted), this permitting the anvil member 67 to move into this position shown in the figure under the influence of spring 68, as soon as the pawls which were operative in the preceding tuning cycle move up as a result of the portion 32b riding up out of the slot in the selector cam. The anvil or holding member 67 then hooks in under the ends 32d and holds the pawls 32, and thus also the stopping pawls 29, in an inoperative position during further rotation to home position and through the selecting sequence. Thereupon, on reversal of the drive motor 20, the shaft 63 starts to rotate in the opposite direction and forces the anvil member to the left, speaking with respect to the position of the parts as viewed in Figure 7, this freeing the selected pawl and permitting operation of the stop combination selected during the stopping portion of the tuning cycle. Movement of the member 69b is limited to a few degrees by engagement of the other portion 69b′ with the shaft 70, as shown in Figure 7, the ring portion 69a thereupon slipping on the shaft and mounting during further rotation of the parts.

As will be apparent from the foregoing description, the multi-turn unit herein disclosed and claimed has the advantages and desirable features of automatic positioning units of the character described and claimed in the aforementioned patents and applications, and in addition incorporates improvements overcoming some of the defects and objections of such earlier units, more particularly in the use of two pawls in each stop combination, the provision of a pawl anvil or holding means and the manual operating arrangement including provisions for automatic declutching and for terminal stopping slightly ahead of the terminal positions achieved in automatic operation.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Apparatus of the character described for positioning a rotatable shaft, including: drive means adapted to rotate the shaft through a plurality of revolutions; a stop member mounted on and rotatable with said shaft; a pawl adapted to have one portion move into stopping engagement with said member; holding means comprising a second pawl normally engaging said first-mentioned pawl for preventing stopping movement thereof; and means for rendering the holding means ineffective in a predetermined revolution of said shaft, this means including a cam driven at a reduced rate but in fixed relationship to the first-mentioned shaft.

2. Apparatus of the character described for positioning a rotatable shaft, including: drive means adapted to rotate the shaft through a plurality of revolutions; a stop member mounted on and rotatable with said shaft; a pawl adapted to have one portion move into stopping engagement with said member; spring means urging said pawl in a stopping direction; holding means comprising a second pawl normally engaging said first-mentioned pawl for preventing stopping movement thereof; spring means urging said second pawl away from the holding position; and means for preventing movement of said second pawl away from holding position until the occurrence of a predetermined revolution of said shaft.

3. Apparatus of the character described for positioning a rotatable shaft, including: drive means adapted to rotate the shaft through a plurality of revolutions; a stop member mounted on and rotatable with said shaft; a pawl adapted to have one portion move into stopping engagement with said member; spring means urging said pawl in a stopping direction; holding means comprising a second pawl normally engaging said first-mentioned pawl for preventing stopping movement thereof; spring means urging said second pawl away from the holding position; and means for preventing movement of said second pawl away from the holding position until the occurrence of a predetermined revolution of said shaft, this means including a cam driven at a reduced rate but in fixed relationship to said shaft.

4. Apparatus of the character described for positioning a rotatable shaft, including: drive means adapted to rotate the shaft through a plurality of revolutions; a stop member mounted on and rotatable with said shaft; a pawl adapted to have one portion move into stopping engagement with said member; spring means urging said pawl in a stopping direction; holding means comprising a second pawl normally engaging said first-mentioned pawl for presenting stopping movement thereof; spring means urging said second pawl away from the holding position; and means for preventing movement of said second pawl away from the holding position until the occurrence of a predetermined revolution of said shaft, this means including a cam driven at a reduced rate but in fixed relationship to said shaft, the axes of said shaft and cam and the axes of pivotal movement of said pawls all being parallel.

5. Apparatus of the character described for positioning a rotatable shaft, including: drive means adapted to rotate the shaft through a plurality of revolutions; a plurality of stop combinations, each such combination including a stop ring mounted on and rotatable with said shaft, said ring having a stop shoulder, a pawl adapted to have a portion move into stopping engagement with said shoulder, and a second pawl normally engaging said first-mentioned pawl for preventing stopping movement thereof; primary cam means for selecting the stop combination to be operative; and secondary cam means for preventing movement of said second pawl out of the holding position until the occurrence of a predetermined revolution of said shaft.

6. Apparatus of the character described for positioning a rotatable shaft, including: drive means adapted to rotate the shaft through a plurality of revolutions; a plurality of stop combinations, each such combination including a stop ring mounted on and rotatable with said shaft, said ring having a stop shoulder, a pawl adapted to have a portion move into stopping engagement with said shoulder, and a second pawl normally engaging said first-mentioned pawl for preventing stopping movement thereof; primary cam means for selecting the stop combination to be operative; and secondary cam means for preventing movement of said second pawl out of the holding position until the occurrence of a predetermined revolution of said shaft, this secondary cam being driven at a reduced rate but in fixed relationship to said shaft.

7. Apparatus of the character described for positioning a rotatable shaft, including: drive means adapted to rotate the shaft through a plurality of revolutions; a plurality of stop combinations, each such combination including a stop ring mounted on and rotatable with said shaft, said ring having a stop shoulder, a pawl adapted to have a portion move into stopping engagement with said shoulder, and a second pawl normally engaging said first-mentioned pawl for preventing stopping movement thereof; primary cam means for selecting the stop combination to be operative; and secondary cam means for preventing movement of said second pawl out of the holding position until the occurrence of a predetermined revolution of said shaft, this secondary cam being driven at a reduced rate but in fixed relationship to said shaft, the axes of said cams and shaft and the axes of pivotal movement of said pawls all being parallel.

8. Apparatus of the character described for positioning a rotatable shaft, including: drive means adapted to rotate the shaft through a plurality of revolutions; a plurality of stop combinations, each such combination including a stop ring mounted on and rotatable with said shaft, said ring having a stop shoulder, a pawl adapted to have a portion move into stopping engagement with said shoulder, and a second pawl normally engaging said first-mentioned pawl for preventing stopping movement thereof; primary cam means for selecting the stop combination to be operative; and secondary cam means for preventing movement of said second pawl out of the holding position until the occurrence of a predetermined revolution of said shaft, said drive means rotating at least said primary cam at the beginning of each automatic tuning cycle and subsequently rotating the shaft and secondary cam without rotating said primary cam.

9. Apparatus of the character described for positioning a rotatable shaft, including: drive means adapted to rotate the shaft through a plurality of revolutions; a plurality of stop combinations, each such combination including a stop ring mounted on and rotatable with said shaft, said ring having a stop shoulder, a pawl adapted to have a portion move into stopping engagement with said shoulder, and a second pawl normally engaging said first-mentioned pawl for preventing stopping movement thereof; primary cam means for selecting the stop combination to be operative; and secondary cam means for preventing movement of said second pawl out of the holding position until the occurrence of a predetermined revolution of said shaft, this secondary cam being driven at a reduced rate but in fixed relationship to said shaft, the axes of said cams and shaft and the axes of pivotal movement of said pawls all being parallel, said drive means rotating the shaft and both cams at the beginning of each automatic tuning cycle and subsequently rotating the shaft and secondary cam without rotating said primary cam.

10. Apparatus of the character described for positioning a rotatable shaft, including: drive means adapted to rotate the shaft through a plurality of revolutions; a plurality of stop combinations, each such combination including a stop ring mounted on and rotatable with said shaft, said ring having a stop shoulder, a pawl adapted to have a portion move into stopping engagement with said shoulder, and a second pawl normally engaging said first-mentioned pawl for preventing stopping movement thereof; primary cam means for selecting the stop combination to be operative; and secondary cam means for preventing movement of said second pawl out of the holding position until the occurrence of a predetermined revolution of said shaft, said drive means being reversible and rotating the shaft and both cams in one direction at the beginning of each automatic tuning cycle until a terminal position has been reached and the primary cam has rendered the desired stop combination operative and subsequently rotating the shaft and secondary cam in the other direction without rotating said primary cam.

11. Apparatus of the character described for positioning a rotatable shaft, including: drive means adapted to rotate the shaft; connecting apparatus between said drive means and said shaft, manual operating means adapted to rotate the shaft; connecting apparatus between said operating means and said shaft; a plurality of stop combinations, each such combination including a stop member normally rotatable with the shaft and a movable stop element adapted to move into stopping engagement with said member; first terminal stop means operative when said shaft is rotated by said drive means; and second terminal stop means operative when said shaft is rotated by said manual operating means.

12. Apparatus of the character described for positioning a rotatable shaft, including: drive means adapted to rotate the shaft; manual operating means adapted to rotate the shaft; a plurality of stop combinations, each such combination including a stop member normally rotatable with the shaft and a movable stop element adapted to move into stopping engagement with said member; first terminal stop means associated with said drive means and operative when said shaft is rotated by said drive means; and second terminal stop means associated with said manual operating means and operative when said shaft is rotated by said manual operating means, this second stop means effecting terminal stopping of the shaft, at each end of its range of movement, at a point slightly ahead of that at which the shaft is stopped by said first terminal stop means.

13. Apparatus of the character described for positioning a rotatable shaft, including: drive means adapted automatically to rotate the shaft; connecting apparatus between said drive means and said shaft; alternative manual operating means adapted to rotate the shaft, this means including a second shaft and means for providing a driving connection between said shafts when manual operation is to be effected and for separating said connection when said drive means is to be operative; connecting apparatus between said operating means and said shaft; a plurality of stop combinations, each such combination including a stop member normally rotatable with the shaft and a movable stop element adapted to move into stopping engagement with said member; first terminal stop means associated with said drive means and cooperating with means on said first-mentioned shaft and operative when said shaft is rotated by said drive means; and second terminal stop means associated with said manual operating means and cooperating with means on said second shaft for effecting terminal stopping of the shaft, at each end of its range of movement, at a point slightly ahead of that at which the shaft is stopped by said first terminal stop means.

14. Apparatus of the character described for positioning a rotatable shaft, including: drive means adapted to rotate the shaft; manual operating means adapted to rotate the shaft, this means including a second shaft and means for providing a driving connection between said shafts when manual operation is to be effected and for separating said connection when said drive means is to be operative; a plurality of stop combinations, each such combination including a stop member mounted on said shaft and a movable stop element adapted to move into stopping engagement with said member; locking means adapted selectively to prevent or permit movement of said stopping members with respect to said shaft; first terminal stop means operative when said shaft is rotated by said drive means; and second terminal stop means cooperating with means on said second shaft for effecting terminal stopping of the shaft, at each end of its range of movement, at a point slightly ahead of that at which the shaft is stopped by said first terminal stop means, operation of said locking means being coordinated with connection and separation of said connection between said two shafts.

15. Apparatus of the character described for positioning a rotatable shaft, including: drive means adapted to rotate the shaft; manual operating means adapted to rotate the shaft, this means including a second shaft; a driving connection between said shafts including a clutch on said first mentioned shaft; a plurality of stop combinations, each such combination including a stop member mounted on said shaft and a movable stop element adapted to move into stopping engagement with said member; locking means adapted selectively to prevent or permit movement of said stopping members with respect to said shaft, said clutch being actuated by said locking means and the construction and arrangement being such that said clutch is disengaged when movement of said stopping members with respect to said shaft is prevented and engaged when such movement is permitted; first terminal stop means operative when said shaft is rotated by said drive means; and second terminal stop means cooperating with means on said second shaft for effecting terminal stopping of the shaft, at each end of its range of movement, at a point slightly ahead of that at which the shaft is stopped by said first terminal stop means, operation of said locking means being coordinated with connection and separation of said connection between said two shafts.

16. Apparatus of the character described for positioning a rotatable shaft, including: drive means adapted to rotate the shaft; manual operating means adapted to rotate the shaft, this means including a second shaft; a driving connection between said shafts including a clutch on said first mentioned shaft; a plurality of stop combinations, each such combination including a stop member mounted on said shaft and a movable stop element adapted to move into stopping engagement with said member; locking means adapted selectively to prevent or permit movement of said stopping members with respect to said shaft, said clutch being actuated by said locking means and the construction and arrangement being such that said clutch is disengaged when movement of said stopping members with respect to said shaft is prevented and engaged when such movement is permitted; and terminal stop means for said shaft.

17. Apparatus of the character described for positioning a rotatable shaft, including: drive means adapted to rotate the shaft; manual operating means adapted to rotate the shaft, this means including a manually rotatable member; a driving connection between said shaft and said manually rotatable member, this connection including a clutch; a plurality of stop combinations, each such combination including a stop member mounted on said shaft and a movable stop element adapted to move into stopping engagement with said member; and locking means adapted selectively to prevent or permit movement of said stopping members with respect to said shaft, said clutch being actuated by said locking means and the construction and arrangement being such that said clutch is disengaged when movement of said stopping members with respect to said shaft is prevented and engaged when such movement is permitted.

18. Apparatus of the character described for positioning a rotatable shaft, including: drive means adapted to rotate the shaft; a plurality of stop combinations, each such combination including a stop member normally rotatable with the shaft and a movable stop element adapted to move into stopping engagement with said member; cam means for selecting the stop combination to be operative; and separate means adapted to prevent engagement of all of said stopping elements with their associated stop members during the initial portion only of each automatic tuning cycle until selection has been effected by the cam means.

19. Apparatus of the character described for positioning a rotatable shaft, including: reversible drive means adapted to rotate the shaft; a plurality of stop combinations, each such combination including a stop member normally rotatable with the shaft and a movable stop element adapted to move into stopping engagement with said member; cam means for selecting the stop combination to be operative; and oscillatable means adapted to prevent engagement of all of said stopping elements with their associated stop members during the initial portion only of each automatic tuning cycle until selection has been effected by the cam means.

20. Apparatus of the character described for positioning a rotatable shaft, including: reversible drive means adapted to rotate the shaft through a plurality of revolutions; a plurality of stop combinations, each such combination including a stop ring mounted on and rotatable with said shaft, said ring having a stop shoulder, a pawl adapted to have a portion move into stopping engagement with said shoulder, and a second pawl normally engaging said first-mentioned pawl for preventing stopping movement thereof; primary cam means for selecting the stop combination to be operative; secondary cam means for preventing movement of said second pawl out of holding position until the occurrence of a predetermined revolution of said shaft; and oscillatable means adapted to prevent engagement of all of said pawls with their associated members during the initial portion only of each automatic tuning cycle.

21. Apparatus of the character described for positioning a rotatable shaft, including: reversible drive means adapted to rotate the shaft through a plurality of revolutions; a plurality of stop combinations, each such combination including a stop ring mounted on and rotatable with said shaft, said ring having a stop shoulder, a pawl adapted to have a portion move into stopping engagement with said shoulder, and a second pawl normally engaging said first-mentioned pawl for preventing movement thereof; primary cam means for selecting the stop combination to be operative; secondary cam means for preventing movement of said second pawl out of holding position until the occurrence of a predetermined revolution of said shaft; and oscillatable means adapted to prevent engagement of all of said pawls with their associated members during the initial portion only of each automatic tuning cycle; and friction drive means for moving said oscillatable member through its limited range of movement in accordance with the direction of movement of said reversible drive means.

RICHARD W. MAY.

REFERENCES CITED

The following references are of record in the file of this patent:

UNITED STATES PATENTS

| Number | Name | Date |
|---|---|---|
| 2,205,170 | Johnson | June 18, 1940 |
| 2,231,156 | Claytor | Feb. 11, 1941 |
| 2,334,724 | Paessler | Nov. 23, 1943 |
| 2,391,470 | May | Dec. 25, 1945 |

Certificate of Correction

April 25, 1950

Patent No. 2,504,998

RICHARD W. MAY

It is hereby certified that errors appear in the printed specification of the above numbered patent requiring correction as follows:

Column 3, line 42, for the word "previous" read *previously*; column 12, line 2, for "presenting" read *preventing*; column 13, line 63, after "shaft" strike out the comma and insert instead a semi-colon;

and that the said Letters Patent should be read with these corrections therein that the same may conform to the record of the case in the Patent Office.

Signed and sealed this 8th day of August, A. D. 1950.

[SEAL]

THOMAS F. MURPHY,
*Assistant Commissioner of Patents.*